April 23, 1957 W. E. BRADLEY 2,790,107

INDEXING STRIP STRUCTURE FOR CATHODE RAY TUBES

Filed April 4, 1955 3 Sheets-Sheet 1

INVENTOR.
WILLIAM E. BRADLEY
BY
[signature]
ATTORNEY

INDEXING STRIP STRUCTURE FOR CATHODE RAY TUBES

Filed April 4, 1955 3 Sheets-Sheet 2

INVENTOR.
WILLIAM E. BRADLEY
BY
Dean V. Hawkins
ATTORNEY

April 23, 1957 W. E. BRADLEY 2,790,107

INDEXING STRIP STRUCTURE FOR CATHODE RAY TUBES

Filed April 4, 1955 3 Sheets-Sheet 3

INVENTOR.
WILLIAM E. BRADLEY
BY
Allan V. Hazeltine
ATTORNEY

United States Patent Office 2,790,107

Patented Apr. 23, 1957

2,790,107

INDEXING STRIP STRUCTURE FOR CATHODE RAY TUBES

William E. Bradley, New Hope, Pa., assignor to Philco Corporation, Philadelphia, Pa., a corporation of Pennsylvania Application April 4, 1955, Serial No. 498,947

19 Claims. (Cl. 315—10)

Figure 1:
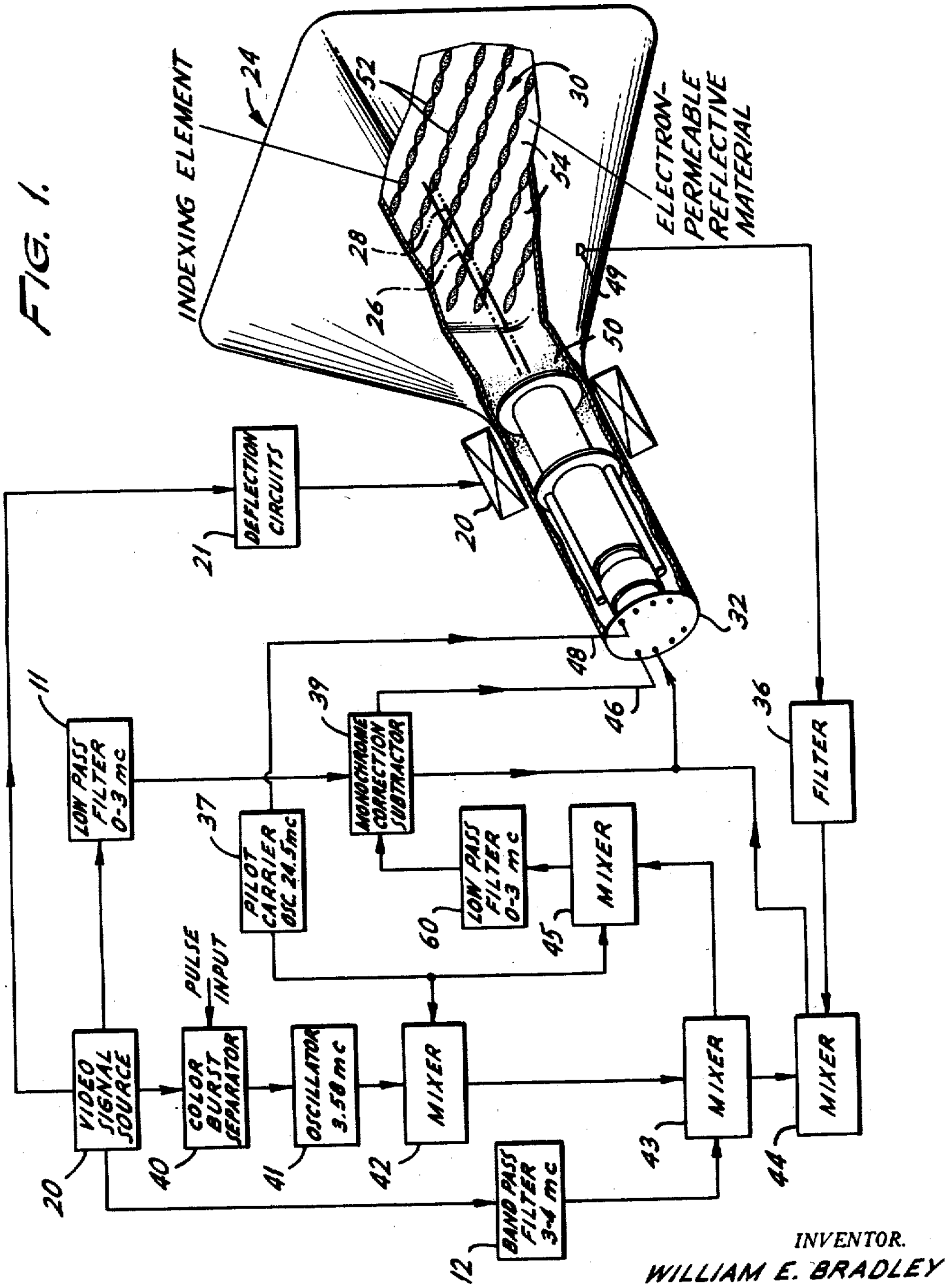

The present invention relates to electrical systems and in particular to cathode ray tube systems which include a beam intercepting structure having means for producing signals which are indicative of the movement of an electron beam as it impinges on the beam intercepting structure.

Color television systems exist which use a type of image reproducing device which comprises a single cathode ray tube having a screen member composed of a number of vertical strips of various fluorescent materials. These strips may be arranged in adjacent groups or "triplets," each of which contains three juxtaposed strips which emit light of three selected colors, such as the three additive primary colors red, blue and green, in response to electrons impinging thereupon. An electron beam is deflected so that it traces on the screen a number of essentially parallel horizontal paths which are substantially perpendicular to the vertical strips. The electron beam is so modulated that, when it impinges on a strip emissive of a particular color, its intensity corresponds to that of a particular color component of a televised scene. Color synchronization may be achieved either by controlling the operation of the circuits which affect the intensity modulation of the electron beam or by controlling the deflection of the electron beam to compensate for non-linearities and other aberrations.

An effective way of synchronizing the modulation of the beam with the movement of the beam is by deriving signals indicative of the position and movement of the electron beam as it impinges on the beam intercepting structure of the cathode ray tube. These derived signals (hereinafter termed "indexing signals") may be used to control the modulation of the electron beam so that, when it impinges upon a particular vertical strip, say a red strip, it is modulated by signals representative of the red components of the televised scene. It should be clearly understood, however, that the present invention also comprehends the use of the derived indexing signals for other purposes. For example, the indexing signals may be used to improve the linearity of the deflection of the cathode ray or to compensate otherwise for known distortions which may exist elsewhere in the system. One example of the way in which indexing signals have been used to improve deflection linearity may be found in the co-pending U. S. application of Wilson P. Boothroyd, Serial No. 219,093, filed April 3, 1951 assigned to the present assignee.

To produce indexing signals, additional "indexing elements" may be interposed between the electron beam source and the beam intercepting structure. These indexing elements may take the form of vertical strips which are placed close to, and parallel with the vertical fluorescent phosphor strips. They may be composed of a material having a secondary electron emissivity which differs from the secondary electron emissivity of the other portions of the beam intercepting structure. The indexing elements are so arranged with respect to the various vertical strips of phosphors that there exists a known relation between the timing of the indexing signals and the impingement of the cathode ray on particular phosphor strips. Such indexing elements are described, for example, in U. S. Patent No. 2,644,030 issued to R. C. Moore on June 30, 1953 and assigned to the present assignee.

Indexing signals derived by scanning across discrete indexing elements such as those described in the Moore patent will tend to be very rich in harmonic frequency content. For example, as the beam traverses first an indexing strip, then the space between it and the next indexing strip, and finally the next indexing strip, there will be generated sharply rising and falling pulses (i. e. pulses having high harmonic frequency content) of secondary emission current from the screen. These high harmonic frequencies are likely to cause unwanted interference with other signals in the reproducing system.

Some color television systems, which use display devices having a beam intercepting structure of the kind hereinbefore described, use a single electron beam for producing the luminous colored image and also for producing the indexing signals. The video frequencies used may lie within a 0–3 mc. range for example. The indexing signals may have a frequency near 7 mc. There is a possibility of interaction between these two signals and their harmonics which may produce beat frequency signals which lie near the video range and which may thus prove troublesome.

In other color television systems which employ beam intercepting structures similar to the one already described, two electron beams are used, one for producing the luminous images (hereinafter called the "video beam"), and the other (hereinafter called the "indexing beam") for generating the indexing signals in conjunction with the indexing elements. To assist in isolating the video frequency range from the indexing signal range, the indexing beam may be modulated with a signal, sometimes called a "pilot carrier," which may have a frequency far above the video frequency range, e. g., near 24.5 mc. As the modulated indexing beam sweeps across the indexing elements the secondary electron emission current is modulated at the rate at which the indexing elements are traversed, thereby producing indexing signals having a frequency of 24.5±7 mc. In addition to the 7 mc. fundamental frequency generated by scanning discrete indexing elements, high harmonics will be generated which may lie near the pilot carrier frequency. Because of non-linearities in the system, beat frequencies may be produced which may impair the effectiveness of the control circuit to which the indexing signals are applied. To minimize the effect of this interference the indexing beam should have a current large enough that indexing signals having an amplitude sufficient for effective functioning of the control circuit may be produced.

Ordinarily the ratio of the current in the video beam to that of the indexing beam is very high. Nevertheless the indexing beam impinges on the phosphor strips as well as on the indexing elements, thus causing a very slight yellowish-white cast over the whole picture. This whitish cast reduces the contrast of the reproduced image. If the production of interfering signals can be substantially reduced, the indexing beam current can likewise be reduced so that the contrast of the reproduced image may be improved.

A primary object of the invention is to provide a beam intercepting structure for a cathode ray tube which assists in producing desired signals in response to the movement of an electron beam thereupon.

Another object of the present invention is to provide a cathode ray tube system in which indexing signals which have relatively small harmonic frequency content are generated by certain elements of a beam intercepting structure in response to the impingement of the electron beam thereupon.

A further object of the invention is to provide a cathode ray tube system in which indexing signals generated in response to impingement by an electron beam do not interfere with certain other desired signals in the system.

Still another object of the invention is to provide, in color television reproducing systems which employ a cathode ray tube having a video beam and indexing beam, means whereby the beam used for producing indexing signals requires less current than heretofore.

Another object of the invention is to improve the contrast of cathode ray tube systems of the type which use a video beam and an indexing beam.

Another object of the invention is to permit the achievement of improved deflection control in cathode ray tube systems of the type in which indexing signals are derived as a result of the impingement of an electron beam on appropriate regions of a beam intercepting structure.

To achieve the foregoing objects, as well as others which will appear, a system constructed in accordance with my invention employs a cathode ray tube having a beam intercepting structure and means for deflecting an electron beam across said structure to trace a plurality of generally parallel paths thereon. In accordance with the invention, the beam intercepting structure includes a plurality of spaced-apart indexing elements which are disposed generally parallel to said plurality of beam paths. The indexing elements have a degree of a given response to electron beam impingement, either in the form of secondary electron emission or in the form of light emission, which is distinctively different from that of the portions intermediate them. Further, in accordance with the invention each indexing element has a dimension, measured transverse to the direction of the beam paths, which varies gradually and cyclically along these beam paths. Means are provided for insuring that, during periodically recurring intervals in its traversal of each beam path, the beam impinges simultaneously on at least one indexing element and on at least one of the portions intermediate the indexing elements.

This apparatus will produce indexing signals which vary as a function of the area of the indexing element or elements impinged. If it is desired to reduce the production of harmonic frequencies during beam scanning of the indexing elements, these elements should have a configuration such that the area thereof which is scanned as the beam is deflected along each path varies according to a function which also has low harmonic content. A sine wave configuration is one shape which may be given to the indexing elements described herein in order to cause them to produce indexing signals having the desired low harmonic frequency content.

In other forms of the invention a variety of configurations of either the spaced or intermediate portions may be employed to assist in producing essentially continuous signals in response to scanning by the electron beam.

Figure 2A:
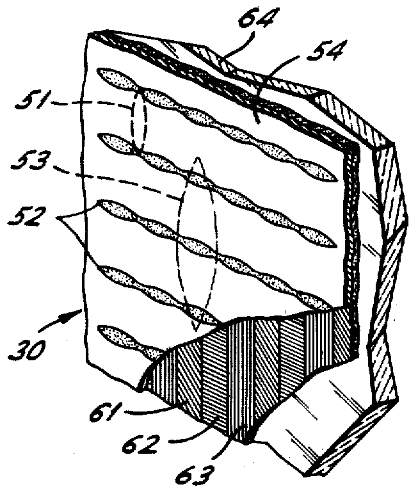
Figure 2B:
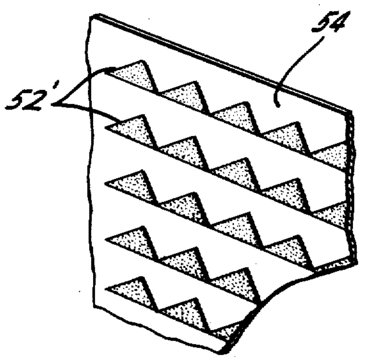
Figure 3:
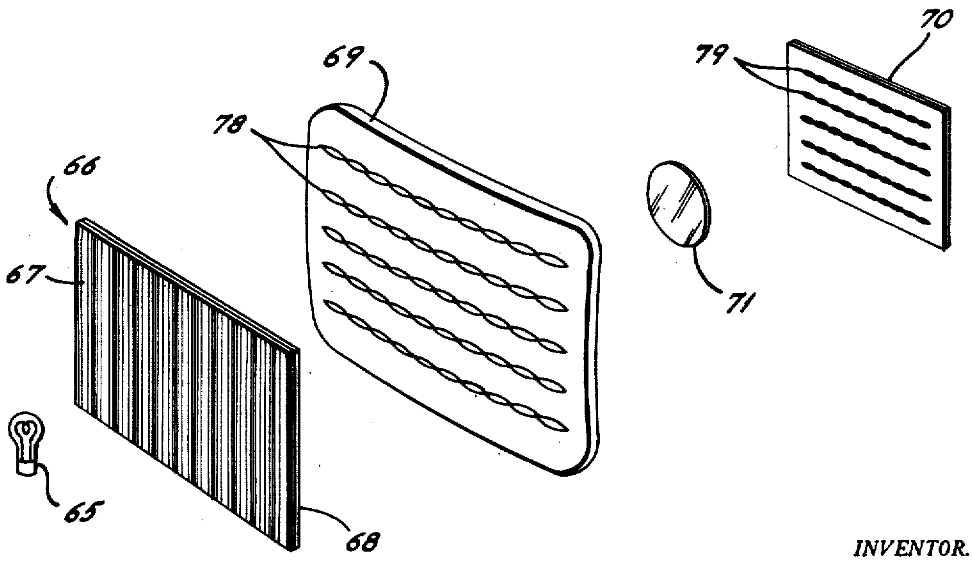
Figure 4C:
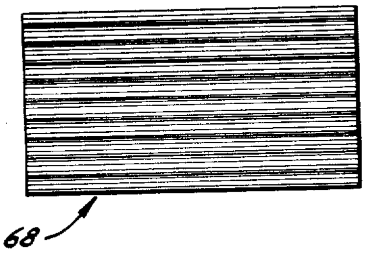
Figure 4A:
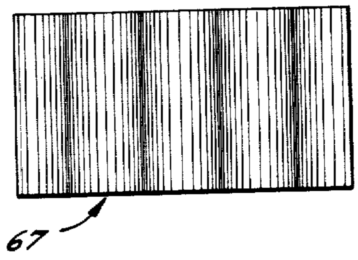
Figure 4B:
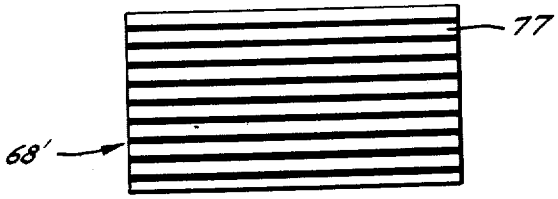
Figure 5:
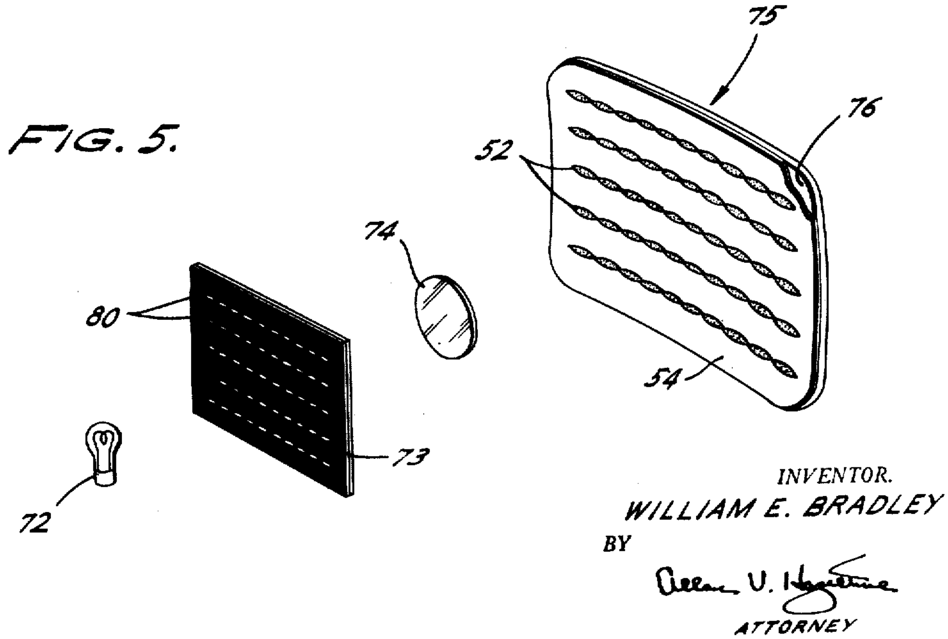

As has been previously explained, an indexing signal having low harmonic frequency content is advantageous in improving contrast and efficiency in preventing contamination of the reproduced image, and also is productive of other beneficial results which will be noted hereinafter. The particular manner of operation and the construction of various systems embodying my invention is described at length in the following description of certain representative embodiments which will be readily understood by reference to the accompanying drawings in which:

Figure 1 is a block and schematic diagram of a color television receiver system which embodies one form of my invention;

Figure 2*a* is an enlarged perspective and partially sectional schematic view of a portion of a beam intercepting structure which may be used in the system of Figure 1;

Figure 2*b* is an enlarged perspective and partially sectional view of a portion of another beam intercepting structure embodying the present invention;

Figure 3 illustrates an apparatus for making a photographic transparency for subsequent use in forming the indexing elements of the beam intercepting structures shown in Figures 2*a* and 2*b*;

Figures 4*a*, 4*b* and 4*c* are enlarged views of some of the elements of Figure 3; and Figure 5 shows a typical method for fabricating the beam intercepting structure of a cathode ray tube which embodies the present invention.

Referring to Figure 1, a color television reproducing system including a cathode ray tube 24, incorporating the present invention is shown. The overall system illustrated is intended to show only one of the many possible cathode ray tube systems with which the invention may be used. The cathode ray tube 24 contains means for producing two independent electron beams 26 and 28 which are adapted to impinge upon a surface of a beam intercepting structure 30. It is entirely possible to use a cathode ray tube having only one electron beam; the two beam system described should be considered solely as an illustrative form. The structure 30 comprises a region having a number of portions or elements 52 which are spaced from one another by the intervening portions 54. The intervening portions 54 may be parts of a continuous layer of a light-reflecting and conductive material on which the elements 52 have been deposited, or they may be a plurality of discrete elements inserted in the interstices between elements 52. The portions 52 and 54 have respectively different degrees of a given form of response to electrons impinging thereupon. The response may be either characteristic secondary electron emissivity or the emission of light. The structure 30 also includes another region having a plurality of vertical strips of phosphors which respectively emit light of selected colors when subjected to electron bombardment. Each of the independent beams 26 and 28 is separately controlled insofar as frequency and amplitude of intensity variations are concerned. For convenience, the beam 26 will be referred to hereinafter as the video beam whereas the beam 28 will be referred to as the indexing beam. In practice the video beam 26 may be slightly above the indexing beam 28.

At the base of the tube 24 a header 32 is located from which protrude leads connected to the various electrodes within the tube 24. For example, lead 46 may be connected to a control grid (not shown) which governs the intensity modulation of the video beam 26. Lead 48 on the other hand may be connected to a control grid (not shown) which modulates the intensity of indexing beam 28.

Signals derived from the incoming video signals emanating from video signal source 20 are processed by the apparatus shown in Figure 1 and are ultimately applied to the control grid for modulating the video beam 26. The signals from source 20 may consist of the composite color video signal produced in accordance with the standards for color television broadcast in the United States which were promulgated in Public Notice No. 53–1663 by the Federal Communications Commission on December 17, 1953. The composite color video signal has a frequency spectrum from 0–4 mc. It contains "luminance" components from about 0–4 mc. These luminance components contain the brightness information of a televised scene. The composite signal also contains "chrominance" components representative of the color information of the same televised scene. In the spectrum of the composite color signal the chrominance components have frequencies toward the upper end of the frequency spectrum of the composite color video signal, i. e. near 3.58 mc. (which is the approximate frequency of the color subcarrier). The chrominance frequencies are distributed among the higher frequency elements of the luminance components in so-called "interleaved" fashion.

The low pass filter 11 is constructed to pass those frequency components of the composite signal from source 20 within the approximate range from 0–3 mc. This range contains mostly luminance components which are supplied to the cathode ray tube 24 for controlling the modulation of the video beam 26 subject only to prior modification in the monochrome subtractor 39 whose operation will be explained below.

A color synchronizing signal commonly known as a "burst," consisting of about 8 cycles of a signal having the same frequency as the color subcarrier, is separated from the composite video signal from source 20 by means of color burst separator 40. The separator 40 may consist of a coincidence circuit (not shown) to which pulses are applied at the horizontal line frequency during the "back porch" portion of the horizontal blanking pulse. The "back porch" portion is that part of the horizontal blanking pulse which follows the trailing edge of the horizontal synchronizing pulse. During this interval the coincidence circuit is gated into conduction thus permitting the passage of only approximately 8 cycles of the burst. The separated bursts are applied to an oscillator 41, which operates at approximately the frequency of the color subcarrier, so as to maintain the latter in frequency and phase with the separated bursts. The frequency and phase controlled 3.58 mc. signal in the output of oscillator 41 is applied to a conventional mixer 42. An oscillatory wave from pilot carrier oscillator 37 is applied simultaneously to a second input circuit of mixer 42 and to lead 48 for modulating the indexing beam 28 at a pilot carrier frequency. Assuming that pilot carrier oscillator 37 operates at 24.5 mc., the mixer 42 produces a difference frequency of approximately 21 mc.

The chrominance components of the composite video signal, which lie in the neighborhood of the 3.58 mc. subcarrier, are also separated from the incoming video signal by means of a band-pass filter 12 which is constructed to pass frequencies within the 3–4 mc. range.

The 21 mc. signal in the output of mixer 42 and the chrominance components which have been separated from the incoming composite video signal by band pass filter 12 are then respectively applied to the two input circuits of a second conventional mixer 43 which produces the sum frequency (24.5 mc.) of the two input signals. The signals produced by mixer 43 will now bear the phase and amplitude modulation of the chrominance components from filter 12, the signal of reference being represented by the 21 mc. signal from mixer 42.

The signals appearings in the output of mixer 43 are applied to one input circuit of a mixer 44. To another input circuit of mixer 44 there are applied those signals which result from the deflection of indexing beam 28 across the elements 52. The output signal from filter 36 is applied to a terminal 49 on the exterior of the tube 24. The terminal 49 is coupled to the structure 30 and to a coating 50 deposited on the inner surface of the tube 24. As the indexing beam 28 is deflected across the structure 30 it impinges upon one or more of the elements 52 and the layer 54. The elements 52, which may have the configuration shown, are comprised of a material having a secondary electron emission ratio differing from the secondary electron emission ratio of layer 54 and the remainder of the beam intercepting structure 30. The layer 54 is composed of a thin, electron-permeable, conducting material on which the elements 52 are deposited. The layer 54 has a low secondary electron emission ratio and also serves as a mirror for light generated by the impingement of the video beam 26 upon a number of vertically disposed strips 61, 62 and 63 of different colored light emitting phosphors (shown in more detail in Figure 2*a*) which are located on the side of the layer 54 remote from the electron guns. The layer 54 may be constructed of aluminum or of any other material having a secondary emission ratio detectably different from the material of which the elements 52 are composed. The construction of the beam intercepting structure 30 will be explained in more detail in connection with Figures 2*a* and 2*b*.

As the indexing beam 28 impinges upon the elements 52 and the layer 54, the emission of secondary electrons therefrom produces signals at terminal 49 which are a function of the frequency of the indexing beam 28 as it is modulated by the frequency at which the undulations of the elements 52 recur. As a result, at the terminal 49, the 24.5 mc. frequency of modulation imparted to the indexing beam 28 has itself been modulated by the scanning of the elements 52 by the beam 28. Assuming that the elements 52 represent a frequency of 7 mc., the indexing signals at the terminal 49 will include the sum of the two frequencies, the difference between the two frequencies, and the original frequencies of 24.5 mc. and 7 mc. The filter 36 selects substantially only the upper sideband, i. e. 31.5 mc. Should the deflection of the beams 26 and 28 be non-linear, the frequency of waves passed by filter 36 will be further affected by frequency or phase variations of the 31.5 mc. signals. It should also be appreciated that, even if the deflection of the beams is linear, the 31.5 mc. signal may nonetheless contain phase variations if the undulations along each line of the elements 52 are not regular (or if the elements 52 are not so laid down as to correct for pincushion distortion and other possible aberrations of the beam scanning pattern.)

Referring again to mixer 44, the 31.5 mc. signal from filter 36, with whatever frequency or phase modulation has been impressed thereupon, is applied to a second input of the mixer 44. The difference frequency components produced by mixer 44 (i. e. the difference frequencies between the 24–25 mc. signals from mixer 43 and 31.5 mc. signal from filter 36) are in the 6.5–7.5 mc. range and bear not only the phase and amplitude modulation of the chromaticity components from filter 12, but also the phase modulation of the indexing signals derived from filter 36. Thus the 6.5–7.5 mc. signals appearing in the output of mixer 44 will be representative of intelligence respecting the three different primary colors at three intervals during each cycle. The phase of this signal, and with it the particular times at which these color intelligence representative signals occur, will adjust themselves to the actual requirements of beam impingement registry, taking into account both variations in sweep linearity and inaccuracies in phosphor strip distribution.

In accordance with the color television broadcast standards promulgated by the F. C. C. (see above) the luminance components are not constituted of equal fractions of the individual red, green and blue representative voltage waves derived from a color television camera. It can be shown by colorimetric analysis that the application of unmodified F. C. C. approved luminance signals to a color television reproducing tube such as tube 24 having substantially equally spaced phosphor strips, will cause improper color rendition of the televised image. To improve color fidelity it is desirable to subtract, from the luminance components from filter 11, a signal which bears a predetermined proportionality to both the amplitude and phase modulation of the chrominance components. This results in improvement of the reproduction of the televised images. This method of color improvement is described in detail in the co-pending application of Stephen W. Moulton, Serial No. 290,775, filed May 29, 1952 and assigned to the present assignee.

Accordingly the output of mixer 43, consisting of chrominance components in the 24–25 mc. band, is applied to a mixer 45. To another input of the mixer 45 the unmodulated 24.5 mc. pilot carrier signal from pilot carrier oscillator 37 is also applied. The mixer 45 produces sum and difference frequencies which are applied to a conventional low pass filter 60 constructed to pass only waves having frequencies within the range of the luminance components, i. e. 0–3 mc. Since one of the input signals to mixer 45 is at a constant 24.5 mc. frequency, while the other input, from mixer 43, varies about a center frequency of 24.5 mc. within a 1 mc. band, the difference frequency components produced by mixer 45 will be proportional to both the amplitude and the phase modulation of the chrominance components of the composite signal. The 0–1 mc. difference frequencies, passed by low pass filter 60, are applied to monochrome correction subtractor 39 where they are subtracted from the signal components applied from low pass filter 11. The subtractor 39 may be of any conventional type. The original luminance components from filter 11 are thus corrected for application to a cathode ray tube such as tube 24 which has substantially equally spaced color emissive phosphor strips.

In the above mentioned co-pending application of Stephen W. Moulton, a system similar to the one hereinbefore described is explained. One difference between that system and the system explained herein resides in the fact that, instead of horizontal elements 52 arrayed on structure 30 at right angles to the vertically disposed phosphor strips 61, 62 and 63 as shown in Figure 2*a* of this application, that system employs a plurality of discrete vertical indexing strips disposed parallel to the phosphor strips. In one embodiment shown in that application there is one indexing strip for each triplet of three vertical phosphor strips. As the indexing beam is swept across these vertical indexing strips, indexing signals are generated which are rich in harmonics. These harmonics often give rise to troublesome "beats" as a result of their being mixed with other frequencies in the system. These beats often cause undesirable effects in the reproduced image, and it is therefore advisable to eliminate them or prevent their formation if possible. By the use of indexing elements such as elements 52 the indexing signals appearing at the terminal 49 are caused to consist substantially only of the sum and difference frequencies of the pilot carrier at 24.5 mc. and the frequency of the undulations of the elements 52. As the indexing beam 28 scans the element 52, the emission of secondary electrons resulting from the bombardment of the material comprising elements 52 will be a function of the area of the elements 52 on which the beam impinges instantaneously.

In Figure 2*a* an enlarged and partially sectional view of the beam intercepting structure 30 is shown. A supporting member 64, which is preferably transparent and rigid, is used as the base on which red, green and blue light emitting phosphors are deposited in vertical strips 61, 62 and 63 as shown. The supporting member 64 may be either a flat glass plate mounted inside tube 24 or the face plate of tube 24 itself. Phosphors suitable for emitting these colors are well known and need be described no further. These phosphors preferably should have a secondary-electron emission ratio which is relatively low. The elements 52, as stated above, have a relatively high secondary emission ratio. A layer 54, preferably of aluminum, is deposited upon the phosphor strips 61, 62 and 63, and the elements 52 themselves are in turn deposited upon the other side of the aluminum layer 54. The layer 54 also serves as a mirror for reflecting toward the observer light generated by the impingement of the video beam 26 upon the phosphor strips 61, 62 and 63. It should be well understood that any coating other than aluminum, which is electron permeable and which has the desired low secondary-electron emission ratio, may also be used. For example, the layer 54 may be constructed of a layer of magnesium or beryllium.

The elements 52, shown in Figure 2*a* with a sinusoidally varying transverse dimension consist of a material having a secondary-electron emission ratio different from that of the material of layer 54. The elements 52 may be composed of magnesium oxide or tungsten, for example.

While Figure 2*a* shows a set of elements 52 whose width varies sinusoidally, it should be appreciated that the invention is not limited to this particular geometrical configuration. The scanning of one or more of the elements 52 by a beam which produces an essentially elliptical spot 51, for example, will not produce any high harmonics which might cause interference with other frequencies in the overall receiver system. Other configurations of the indexing elements are possible which also tend to reduce the production of harmonic frequencies. So long as the high secondary-electron emission material is deposited in the form of elements such as elements 52, which produce continuous signals during each horizontal sweep, few, if any, harmonics will be generated during the scanning of the electron beam over them.

In Figure 2*b* elements 52' are shown which have a sawtooth configuration. For certain purposes indexing signals having a sawtooth modulation may be desirable, and the apparatus of Figure 2*b* is capable of producing these without also producing a plethora of unwanted harmonics. The indexing elements 52' are shown deposited upon the aluminum layer 54; other parts of the beam intercepting structure 30 are omitted since they are identical with the structure 30 shown in Figure 2*a*.

Thus far the invention has been described in terms of indexing elements which have a fairly high secondary-electron emission ratio, whereas the layer 54 has a low secondary emission ratio. However, it is apparent that, if the elements 52 were to have a very low emissivity whereas the layer 54 were to have a very high emissivity, substantially the same indexing signals, except for the opposite polarity, would be produced at terminal 49. Therefore it should be noted that it is not the indexing elements 52 in themselves which produce the indexing signals in response to electron bombardment. Rather it is the difference in the degree of their response to the beam 28 as compared with the degree of response of other portions, such as layer 54, of the structure 30, provided, of course, that the beam 28 impinges simultaneously on at least a part of both portions at least during certain times during the scanning of each horizontal line.

In order to insure that the beam 28 does impinge simultaneously on at least part of an element 52 and on at least part of layer 54 during predetermined intervals, any of several precautions may be taken. For example, there may be used a servo-controlled vertical deflection circuit which insures that the beam always traverses a substantially fixed pattern of paths, during each of which it will impinge periodically on elements 52 and layer 54 simultaneously. In such a system the size of the spot of beam 28 is not critical.

Alternatively the spot 51 may be given a dimension, measured along a vertical axis, which is at least larger than the smallest distance between any two adjacent elements 52, and preferably is larger than the largest distance between such elements. Then, even if the vertical deflection system is not stable, a portion of the spot 51 will always impinge either on the element above or on the one below the one which it should properly scan several times during the scan of each line. Since the undulations of any two adjacent elements 52 are in substantial alignment, the fact that the beam 28 may not scan the proper element does not materially affect the phase or frequency of the indexing signals produced.

Where indexing signals having a greater amplitude than have heretofore been available are desired, the impinging portion of the beam may take the vertically elongated form shown by dashed line spot 53 in Figure 2*a*. The beam spot may be narrow and extend over two or three of the elements 52 as shown.

Figure 3 illustrates apparatus for performing a portion of a process for depositing the indexing elements 52 or 52' on the layer 54. The apparatus illustrated also tends to compensate for what is known as "pincushion" distortion. This distortion is due to the fact that the two beams within the tube 24 tend to assume a relative displacement having an appreciable component in a direction radially outward from the center of deflection whenever the beams are not centered laterally or vertically. This distortion increases as the beam is increasingly radially displaced from the center. If indexing elements are placed inside the tube 24 for improving the linearity of the deflection of the electron beam, they should be so disposed that, as the beam moves horizontally, no variations in the phase or frequency of the indexing signals are produced as a result of the aforementioned pincushion effect. To this end the indexing elements should themselves be laid down in a predetermined fashion as will be explained below.

A point source of light, shown schematically by the apparatus designated by numeral 65, supplies light which passes through a set of filters 66 comprised of a filter 67 and a filter 68. Filter 67 is shown in enlarged form in Figure *4a* and it will be noted that it is a filter having a periodically varying density. Filter 68, which is placed in essentially the same focal plane as the filter 67, may be a filter of periodically varying density as shown in Figure 4*c*. However, its areas of any given density are more closely spaced than those of filter 67, and are vertically displaced, whereas those of filter 67 are horizontally displaced. Thus the set of filters 66 comprises two variable density filters 67 and 68 having predetermined periodicities with density variations at right angles to one another. As a result of their combined effect, light is transmitted through the set 66 onto a light diffusing auxiliary plate 69. The plate may be shaped from a suitable plastic material to simulate the curvature of a conventional face plate of a cathode ray tube. The dark areas of plate 69 represent the portions from which light has been masked off by the combined effects of the set of filters 66. The light pattern 78, produced on the auxiliary plate 69, now contains the desired pincushion distortion. The image of this pattern is projected by an optical system 71 upon a photosensitive plate or film 70. The plate 70 may have a photosensitive or photographic emulsion on its surface which is closest to the optical system 71. Light from the pattern 78 on the auxiliary plate 69 causes a reaction of the photographic emulsion thereby producing a latent image of the light pattern on plate 69. After development the pattern 79 will be opaque as shown in Figure 3.

Figure 5 shows additional apparatus for use in the process of producing the desired indexing element pattern on the inner portion of the face plate of a cathode ray tube. The apparatus shown in Figure 5 serves to produce a pattern which is the reverse of pattern 79 of Figure 3, that is to say a transparent pattern on an opaque background. Such pattern 80 is shown on plate 73 in Figure 5. It may be easily obtained by projecting the pattern 79 of plate 70 onto another plate 73 and simply developing the image. Light from a source 72, which may be identical with point source 65 of Figure 3, passes through the photographic plate 73 and is focused by an optical system 74 upon the inner, concave surface 76 of a cathode ray tube faceplate 75. It should be understood that the vertical strips of the three different phosphors have already been deposited in a predetermined pattern on the concabe faceplate 75 of the cathode ray tube. Also, after the phosphor strips have been deposited, an aluminum layer 54 has been placed over the phosphor strips. Over the aluminum layer 54 a layer of photosensitive gel is spread. The light focused upon the photosensitive gel so affects the latter that only the unexposed portion may be washed away by an appropriate solvent. After exposure of the gel, magnesium oxide, or other material having a high secondary-electron emission ratio, is placed on the gel. The gel is then subjected to a solvent which washes away all unexposed portions thereof and any of the magnesium oxide in contact therewith. There remains only the exposed gel, on top of which is the magnesium oxide. The gel is then baked out so that the magnesium oxide adheres directly to the aluminum layer 54.

The photosensitive gel may consist of a polyvinyl alcohol such as "Elvanol 52–22" which is added to distilled water at 120° F., filtered and then mixed with ethyl-alcohol and a solution of ammonium or potassium dichromate. Further particulars of the method for making an appropriate sensitive gel may be found in the copending application of Paul D. Payne, Serial No. 375,345, filed August 25, 1953 and assigned to the present assignee. The photosensitive gel described is soluble in water.

There are, of course, other methods of producing the desired pattern of indexing elements on the inner surface of the faceplate of the particular cathode ray tube. If compensation for pincushion effect is not desired, the processes shown in Figure 3 and Figure 5 may be dispensed with. Instead, the following process may be substituted: After the aluminum layer 54 has been deposited on the inner surface of the faceplate 75 a layer of the polyvinyl alcohol gel mentioned above as applied on the aluminum layer. Light from a point source such as source 65 of Figure 3 is passed through a set of filters, one of which is similar to filter 67 of Figure *4a*, and the other of which is similar to filter 68' of Figure 4*b*. It is to be noted that filter 68' does not have gradual vertical gradations of density which recur with a predetermined periodicity. Instead it consists merely of a number of horizontally ruled opaque lines. The filters 67 and 68' are placed essentially in contact with one another so that they are in approximately the same focal plane. Light passing through these two filters is then projected upon the layer of polyvinyl alcohol gel. It has been found that with material such as the photosensitive polyvinyl alcohol gel the width of a line of element produced by projection of light thereupon after the unexposed gel has been washed away is a function of the exposure of the gel to the light. That is to say, if a given intensity of a line of light is permitted to fall upon the gel for $\frac{1}{10}$ of a second, for example, the resultant line produced after development of the gel will not be as wide as it will be if the exposure time is increased to $\frac{1}{5}$ of a second. Hence light passing first through a typical interstice 77 between two adjacent opaque lines on the filter 68' of Figure 4*b*, and thence through the filter 67 of Figure 4*a*, will cause the width of the line produced by exposure of the gel to vary from left to right at the rate determined by the density distribution of the filter 67, i. e. at a sinusoidal rate. This alternative process is mentioned merely by way of illustration of many of the other ways of producing desired geometric configurations in the indexing elements on the inside face of the cathode ray tube.

Another way of producting filters 67 and 68 is to photograph a master ruled grill pattern of lines somewhat out of focus so that the edges of the lines are indefinite and blurred. Still another method is to subject a photographic plate to varying exposures along its major axis. This may be accomplished by moving a focal plane shutter with an aperture whose axis is perpendicular to the film axis across the film while the intensity of the incident light is varied cyclically. Of course the film itself may be moved where the aperture is in a fixed position. Many variations of these alternative methods are possible; the methods discussed are suggested merely to demonstrate some of the possibilities.

Although the invention has been explained in terms of rectilinear beam scanning pattern, such as one used to produce a television raster, the invention is equally applicable to other types of scan such as the spiral scan of a P. P. I. type of radar system. In such case, there may be one continuous indexing element arranged in the form of a spiral which generally is parallel to the spiral path traversed by the video beam. The invention will otherwise operate in a manner similar to that of the conventional television scan.

What I claim is:

1. A cathode ray tube system comprising: an electron beam intercepting structure, means for producing an electron beam, means for causing said beam to traverse said structure in a plurality of generally parallel scanning paths, said structure including a plurality of spaced portions and portions intermediate said spaced portions, said spaced portions having a response to the impingement of electrons different from that of said intermediate portions, said spaced portions being disposed generally parallel to said paths and having dimensions transverse to said paths which vary cyclically along said paths, and means for causing said beam to impinge simultaneously on at least a part of one of said spaced portions and on at least a part of one of said intermediate portions at predetermined intervals during the traversal of each of said paths by said beam.

2. A cathode ray tube system comprising: an electron beam intercepting structure, means for producing an electron beam, and means for causing said beam to traverse said structure in a plurality of generally parallel scanning paths, said structure including a plurality of spaced portions and portions intermediate said spaced portions, said beam being caused to impinge simultaneously on at least one of said spaced portions and on at least one of said intermediate portions at predetermined intervals during the traversal of each of said scanning paths by said beam, said spaced portions having a response to the impingement of electrons thereupon which differs from said intermediate portions, said spaced portions being disposed generally parallel to said paths and having dimensions transverse to said paths which vary cyclically along said paths.

3. A cathode ray tube system comprising: an electron beam intercepting structure, means for producing an electron beam, and means for causing said beam to impinge upon said structure in a plurality of generally parallel scanning paths, said structure including a plurality of spaced portions and portions intermediate said spaced portions, the minimum space between any two adjacent spaced portions being smaller than the dimension, transverse to said scanning paths, of the impinging area of said beam, said spaced portions having a response to the impingement of electrons different from that of said intermediate portions, said spaced portions being disposed generally parallel to said paths and having dimensions transverse to said paths which vary gradually and cyclically along said paths.

4. A cathode ray tube system comprising: an electron beam intercepting structure, means for producing an electron beam, and means for causing said beam to traverse said structure in a plurality of generally parallel scanning paths, said structure including a plurality of spaced portions and portions intermediate said spaced portions, said beam having an impinging area whose major axis is substantially transverse to said paths and whose dimension, measured along said major axis, is greater than the space between any two adjacent spaced portions at several points along each of said paths, said spaced portions being disposed generally parallel to said paths and having dimensions transverse to said paths which vary cyclically along said paths, said portions having a response to the impingement of electrons thereupon which differs from that of said intermediate portions.

5. A cathode ray tube system comprising: a beam intercepting structure, means for producing an electron beam and means for causing said beam to trace a plurality of generally parallel paths upon said structure, said beam intercepting structure having a plurality of spaced portions and intermediate portions, said spaced portions and said intermediate portions having respectively different responses to the impingement of electrons thereupon, said spaced portions being disposed generally parallel to said paths and having dimensions transverse to said paths which vary cyclically and gradually along said paths, and means for causing said beam to impinge simultaneously on at least one of said spaced portions and on at least one of said intermediate portions at cyclically recurrent intervals during its traversal of each of said paths.

6. Cathode ray tube apparatus comprising: a beam intercepting structure, means for producing an electron beam, means for causing said electron beam to trace a pattern of generally parallel paths on said structure, said structure including spaced portions and portions intermediate said spaced portions, said spaced portions and said intermediate portions having respectively different responses to the impingement of electrons thereupon, said spaced portions being disposed generally parallel to said beam paths and having dimensions transverse to said paths which vary cyclically along said paths, and means for causing said beam to impinge simultaneously on at least one of said spaced portions and on at least one of said intermediate portions at cyclically recurrent intervals during its traversal of each of said paths thereby producing signals related to the respective electron impingement responses of said portions, and means for applying said signals to circuits external to said tube.

7. A beam intercepting structure for a cathode ray tube comprising: a first region which includes a plurality of essentially parallel strips, each of which is composed of phosphors emissive of light of a selected color in response to impingement of electrons thereupon, and a second region including a plurality of spaced strip-like portions and strip-like portions intermediate said spaced portions, said spaced portions and said intermediate portions having a given response of the same form but of substantially different degree to the impingement of electrons thereupon, each if said portions being disposed with its longitudinal axis substantially transverse to the longitudinal axis of said phosphor strips, each of said spaced portions having a width which varies cyclically along its longitudinal axis, said variations in width bearing a predetermined geometrical relationship to said phosphor strips.

8. The structure according to claim 7 wherein said form of given response to electron impingement takes the form of emission of secondary electrons.

9. The structure according to claim 7 wherein said form of given response to electron impingement takes the form of emission of radiant energy.

10. In a cathode ray tube system the combination comprising: means for producing at least one electron beam; beam intercepting means; means for causing said electron beam to scan said beam intercepting means along a plurality of generally parallel spaced paths; said beam intercepting means including a first region and a second region, said first region having a plurality of spaced portions and a plurality of portions intermediate said spaced portions, said spaced portions and said intermediate portions having respectively different degrees of a given form of response to the impingement of electrons thereupon, said second region having a form of response to electron impingement different from said given form of response, said spaced portions being disposed generally parallel to said plurality of scanning paths and having dimensions transverse to said paths which vary cyclically and gradually along said paths; means for causing said beam to impinge on at least one of said spaced portions and on at least one of said intermediate portions simultaneously along each of said paths thereby producing signals related to the respective degrees of said given response.

11. The combination according to claim 10 further characterized in that said given form of response is the emission of secondary electrons and said response of said second region is the emission of light.

12. A cathode ray tube system comprising in combination: means for producing an electron beam; a beam intercepting structure; means for causing said beam to scan said structure along a plurality of generally parallel paths, said structure including a first region having a plurality of essentially parallel vertical strips, said vertical strips being composed of phosphors which emit red, green and blue light in response to the impingement of electrons thereupon; said structure further including a second region which includes a plurality of essentially parallel spaced portions and portions intermediate said spaced portions, said spaced portions and said intermediate portions having respectively different degrees of a given response to the impingement of electrons thereupon, each of said spaced portions having dimensions transverse to said paths which vary cyclically with respect thereto, and means for causing said beam to impinge continuously on at least one of said spaced portions and periodically on at least one of said intermediate portions throughout each path thereby producing signals related to the respective degrees of said given response.

13. The system according to claim 12 wherein said given response is the emission of secondary electrons.

14. The system according to claim 12 wherein said given response is the emission of light.

15. The system according to claim 12 wherein said varying dimensions vary according to a sine wave function.

16. The system according to claim 15 with the addition of means for applying said produced signals to circuits external to said tube.

17. A cathode ray tube system comprising in combination: means for producing first and second electron beams, a beam intercepting structure having first and second regions, means for causing said first beam to scan said first region along a plurality of substantially parallel spaced paths, said first region including a plurality of spaced portions and a plurality of portions intermediate said spaced portions, said spaced portions being disposed generally parallel to said plurality of beam paths, said spaced portions having dimensions transverse to the major axes of said spaced portions which vary with respect to successive points along said major axes, said spaced portions and said intermediate portions having respectively different degrees of secondary electron emissivity in response to the impingement of electrons thereupon; said beam intercepting structure further including a second region having a plurality of essentially parallel vertical strips, said vertical strips being composed of phosphors which emit red, green and blue light in response to the impingement of electrons thereupon; means for causing said second beam to scan said second region along a plurality of substantially parallel spaced paths whereupon said second region produces luminous images corresponding to televised objects; and means for causing said first beam to impinge continuously on at least one of said spaced portions and periodically on at least one of said intermediate portions along each beam path thereby producing signals relating to the respective degrees of secondary electron emissivity of said portions.

18. The system according to claim 17 wherein said varying dimension varies according to a sine wave function.

19. The system according to claim 18 wherein said means for causing said first beam to impinge continuously on at least one of said spaced portions and periodically on at least one of said intermediate portions comprises means for causing said first beam to scan said first region with an impinging area whose major axis is substantially transverse to said spaced portions and is greater than the widest space intermediate any two adjacent spaced portions.

References Cited in the file of this patent

UNITED STATES PATENTS

| | | |
|---|---|---|
| 2,689,269 | Bradley | Sept. 14, 1954 |
| 2,689,314 | Gunderson | Sept. 14, 1954 |
| 2,689,927 | Bradley | Sept. 21, 1954 |
| 2,715,155 | Bryant | Aug. 9, 1955 |

UNITED STATES PATENT OFFICE
CERTIFICATE OF CORRECTION

Patent No. 2,790,107

April 23, 1957

William E. Bradley

It is hereby certified that error appears in the printed specification of the above numbered patent requiring correction and that the said Letters Patent should read as corrected below.

Column 5, line 52, for "appearings" read -- appearing --; column 9, line 67, for "concabe" read -- concave --; column 10, line 26, for "as applied" read -- is applied --; line 40, for "line of" read -- line or --; line 59, for "producting" read -- producing --; column 11, line 65, for "pace" read -- space --; column 12, line 40, for "each if" read -- each of --.

Signed and sealed this 14th day of July 1959.

(SEAL)
Attest:

KARL H. AXLINE
Attesting Officer

ROBERT C. WATSON
Commissioner of Patents